United States Patent [19]

Crorey

[11] Patent Number: 5,549,442
[45] Date of Patent: Aug. 27, 1996

[54] ARTICLE TRANSFER APPARATUS

[75] Inventor: David J. Crorey, Utica, Mich.

[73] Assignee: Leland D. Blatt, Grosse Pointe Farms, Mich.

[21] Appl. No.: 313,711

[22] Filed: Sep. 27, 1994

[51] Int. Cl.$^6$ ................................................. B65G 25/00
[52] U.S. Cl. ........................................ 414/751; 212/203
[58] Field of Search .................................. 414/749–753, 414/618; 294/65; 212/203

[56] References Cited

U.S. PATENT DOCUMENTS

| | | |
|---|---|---|
| 3,884,363 | 5/1975 | Ajlouny . |
| 4,496,063 | 1/1985 | Ishii et al. . |
| 4,655,662 | 4/1987 | Yoshieda et al. . |
| 4,892,183 | 1/1990 | Fenton . |

OTHER PUBLICATIONS

W&M Engineering & Automation GmbH & Co., W&M-Report.

*Primary Examiner*—Donald W. Underwood
*Attorney, Agent, or Firm*—Young & Basile, P.C.

[57] ABSTRACT

An article transfer apparatus for moving at least one article from a first position to a second position wherein a single drive independently drives one of two lift arms that are reciprocally movable between the first position and the second position independent of one another. The article transfer apparatus provides a base member that is movable on a guide rail for movement along a predetermined path. First and second lift arms are movably supported on the base member for reciprocal and independent movement between the first and second positions. The movement between the first and second positions of the lift arms define a first path of travel, and the base member moving along the guide rail defines a second path of travel wherein the first path of travel is substantially perpendicular to the second path of travel. The single drive cooperatively engages the first and second lift arm to independently drive the first and second lift arms between the first position and the second position. A supporting means is provided to support one of the first and second lift arms in the first position when the other of the first and second lift arms is driven outside the first position by the single drive.

12 Claims, 3 Drawing Sheets

ARTICLE TRANSFER APPARATUS

FIELD OF THE INVENTION

The present invention relates to an article transfer apparatus, and more particularly, an apparatus for moving at least one article from a first position to a second position wherein a single drive driving means independently drives one of two article engaging means that are reciprocally movable between the first position and the second position independent of one another.

BACKGROUND OF THE INVENTION

The continuing advancements and developments in production technology have lead to continually faster and more efficient processing machines and automated production cells. Developments in production have forced the article transfer technology to simultaneously advance in order to provide faster, more efficient production equipment with fewer parts. In so doing, article transfer systems have become faster, more efficient and highly advanced.

Advancements in article transfer technology can be expensive, such as with the advent of programmable robotic systems, servo motor drives, CNC controllers, etc. Such systems may exhibit state of the art technologies, but in the highly competitive manufacturing environment, such systems may be inappropriate, over-qualified and/or too expensive. For example, an article transfer apparatus that simply moves an article from one location to another without a high degree of precision and/or repeatability does not require highly advanced equipment to perform such an operation. Also, hostile and contaminated environments may not be practical for such highly advanced technology since such equipment may be overly sensitive to noise, vibration, dirt, etc.

Thus, it would be desirable to provide an inexpensive, durable and reliable article transfer apparatus for transferring articles from one location to another in a manufacturing environment.

SUMMARY OF THE INVENTION

The present invention provides an article transfer apparatus for moving at least one article from a first position to a second position wherein a single drive driving means independently drives one of two article engaging means that are reciprocally movable between the first position and the second position independent of one another. A first path of travel is defined by the movement of the first and second work piece engaging means moving between the first position and the second position. A second path of travel is defined by a moving means moving the article transfer apparatus between a plurality of work stations wherein the second path of travel is substantially perpendicular to the first path of travel. The second path of travel may be defined by an overhead guide rail, wherein the moving means provides a base member movable on the guide rail for travel along the second path of travel.

The first and second article engaging means each provide a lift arm movably connected to the base member. A releasable article holder is coupled to an end of the lift arm, and an elongated driven member is connected to the other end of the lift arm. Each of the elongated driven members provide a guide slot extending longitudinally through the elongated driven member. An end portion of each of the elongated driven members overlap one another when in the first position so that the guide slots of each of the elongated driven members are commonly aligned.

The single drive driving means provides a support column extending vertically upward from the base member. A swing arm is rotatably supported by the vertical support column for rotational movement about a rotational axis. A first and second roller are coaxially aligned and rotatably supported on the swing arm. Each of the first and second rollers rollably engage the guide slots of their respective first and second elongated driven members for driving the first and second article engaging means between the first position and the second position. When the swing arm rotates toward the first article engaging means, or counterclockwise direction, the first roller rolls along the guide slot of the first driven member. As the swing arm continues to rotate, the rotational motion of the swing arm is transferred to linear motion of the first article engaging means. The second roller disengages from the second guide slot of the second driven member soon after the swing arm advances toward the first article engaging means. A supporting means supports the second article engaging means in the first position when the second roller of the swing arm disengages from the guide slot of the second elongated driven member. The swing arm rotates 180° to the second position, and the swing arm reciprocally rotates back 180° to the first position. The swing arm may then rotate toward the second article engaging means, or clockwise direction, wherein the second article engaging means is driven to the second position, and the first article engaging means is supported in the first position by the supporting means, as previously described. The swing arm may then reciprocally return to the first position by rotating counterclockwise 180°.

The supporting means provides a cam pivotally connected to the vertical support column of the driving means. A latch member is fixedly connected to the top of the cam. A cam follower is rotatably supported on the end of the swing arm, and the cam follower engages the cam when entering or exiting the first position. When the swing arm rotates toward one of the first and second article engaging means, the cam follower engages the cam and pivots the latch member toward the other of the first and second article engaging means. A flange is provided on each of the first and second elongated driven members, and the flange remaining in the first position engages the latch member when the roller disengages from the guide slot of the elongated driven member of the article engaging means remaining in the first position. Thus, the article engaging means that is not engaged by the single drive driving means is supported by the latch member in the first position.

Thus, the object of the present invention is to provide a new and improved article transfer apparatus that provides a simple, inexpensive and reliable apparatus for transferring articles from a first position to a second position along a predetermined path of travel.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
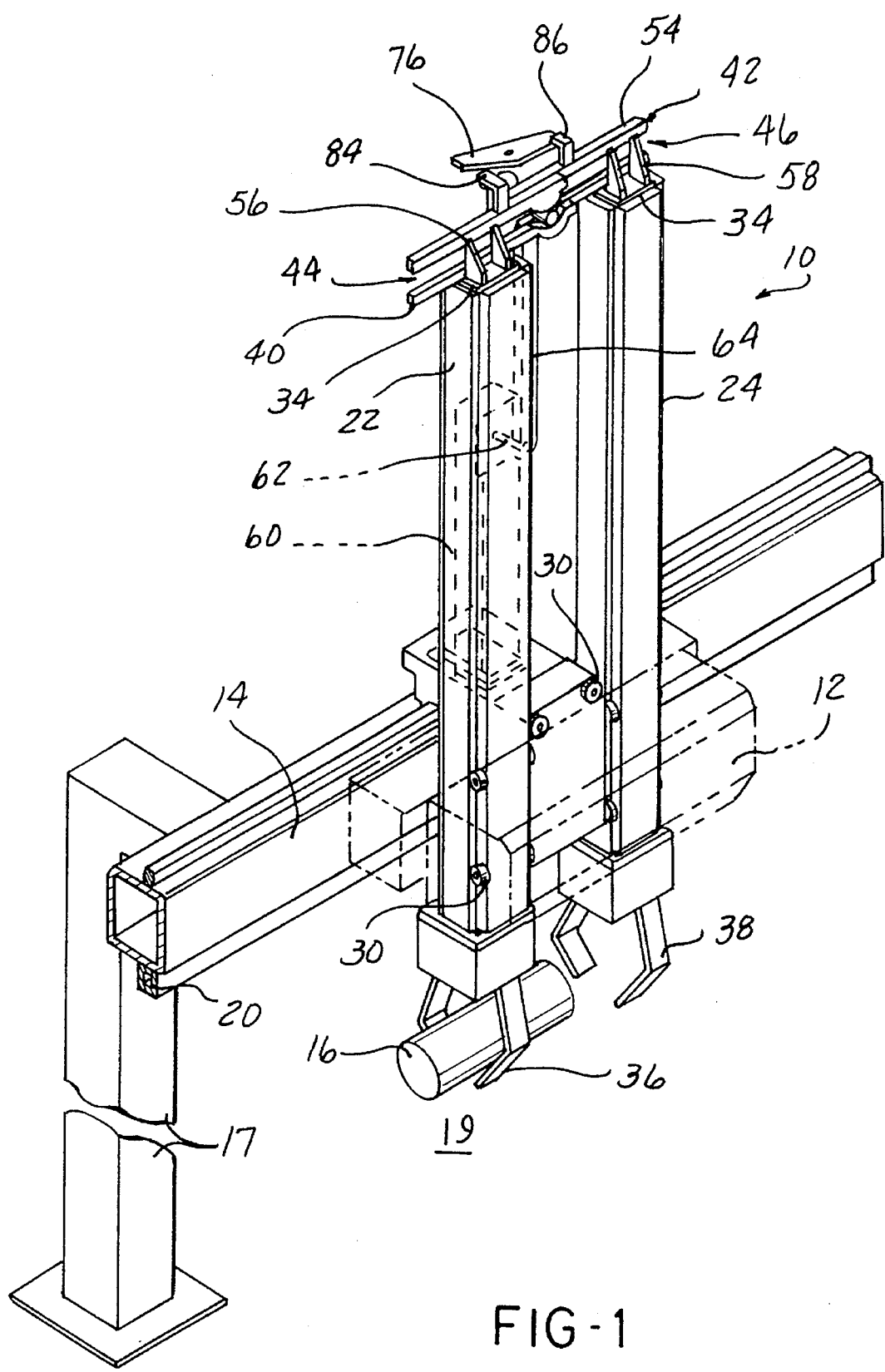
FIG. 1 is a perspective view showing the article transfer apparatus mounted on an overhead guide rail with a portion of a base member shown in phantom.

FIG. 1 shows the article transfer apparatus 10 according to the present invention. The article transfer apparatus 10 provides a base member 12 that is movable on an overhead guide rail 14. The guide rail 14 defines a second path of travel wherein the base member 12 moves the article transfer apparatus 10 along the second path of travel or guide rail 14 in a predetermined path. The article transfer apparatus 10 may stop along the second path of travel or guide rail 14 at a plurality of predetermined work stations. Each work station may be defined by a machining operation, assembly operation, inspection operation, loading and unloading operation, etc. First and second article engaging means are movably connected to the base member 12 for independent, reciprocal movement between a first position, wherein the article engaging means raises or retracts away from a work station for movement along the second path of travel, and a second position, wherein the article engaging means lowers or extends toward a work station for manipulation of an article 16. A single drive driving means independently drives one of the first and second article transfer means between the first position and the second position. A supporting means supports one of the first and second article engaging means in the first position when the other of said first and second article engaging means is driven by the single drive driving means outside of the first position.

Figure 2:
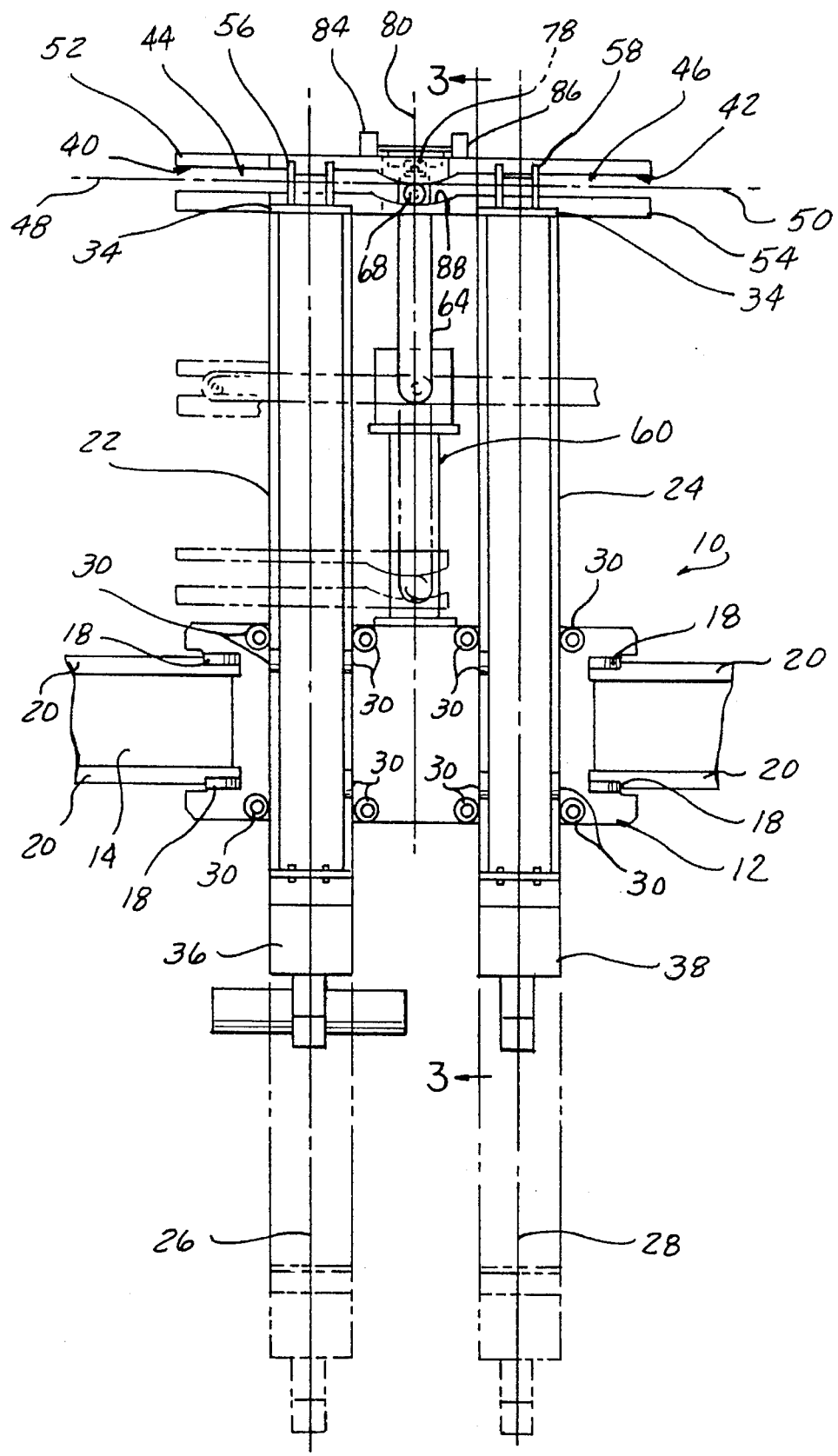
FIG. 2 is a front view showing a first and second article engaging means in a first position and showing in phantom the first and second article engaging means in a second position.
Figure 3:
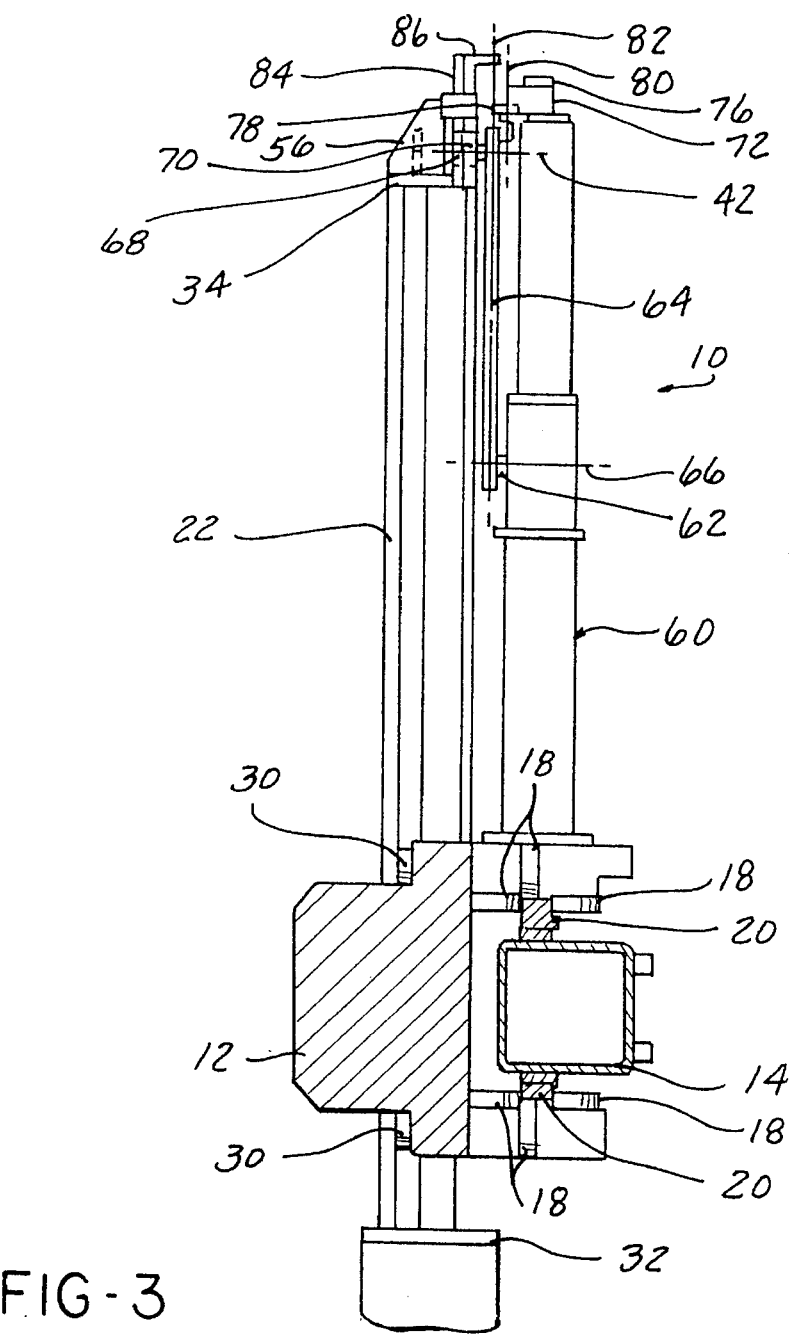
FIG. 3 is a section view in the direction of arrows 3—3 in FIG. 2 showing the article transfer apparatus in the first position.

To reduce the amount of floor space required to operate the article transfer apparatus 10, the guide rail 14 is mounted overhead or above the work stations wherein the articles 16 are lowered and raised between the first position and the second position. The guide rail 14 may be supported by support members 17 that are mounted to a floor 19, or the support members 17 may be connected to any other support structure such as a ceiling structure, wall or support beam (all not shown). The base member 12 has a plurality of rollers or wheels 18 which roll on guide ways 20 provided on the guide rail 14, as seen in FIGS. 1–3. A power means, such as a motor or drive unit (not shown), is provided for powering movement of the base member 12 along the guide rail 14.

In order to move the articles 16 between the first and second positions, the first and second article engaging means each provides an elongated substantially rectangular lift arm 22, 24, respectively, having a longitudinal axis 26, 28, respectively, extending the length of the lift arm 22, 24. The base member 12 provides a plurality of rollers 30 which guide and movably support the lift arms 22, 24 along the longitudinal axis 26, 28 of the lift arms 22, 24 wherein the longitudinal axis 26, 28 is substantially normal to the second path of travel or guide rail 14. Each of the lift arms 22, 24 has a bottom end 32 and a top end 34 wherein the bottom end 32 of the lift arms 22, 24 has a releasable article holding means connected thereto. The first and second releasable article holding means provides releasable grippers 36, 38, respectively, for securing and releasing the article 16. The present invention is not limited to grippers 36, 38 as the releasable article holding means, but rather, any conventional releasable article holding means may be coupled to the bottom end 32 of the lift arms 22, 24, such as vacuum cups (not shown).

The first and second article engaging means each receives the single drive driving means by providing a first and second elongated driven member 40, 42, respectively, connected to the top end 34 of the first and second lift arms 22, 24, respectively. Each driven member 40, 42 has a guide slot 44, 46, respectively, extending along a longitudinal axis 48, 50, respectively, of the driven members 40, 42 wherein the longitudinal axis 48, 50 of the driven members 40, 42 is substantially normal to the longitudinal axis 26, 28 of the lift arms 22, 24. The guide slots 44, 46 extend through the driven members 40, 42 both longitudinally and laterally such that the guide slots 44, 46 are defined by a pair of substantially parallel and rectangular bars 52, 54 of the driven members 40, 42, respectively. The bars 52, 54 are connected by a pair of substantially parallel and triangular support members 56, 58, respectively, that extend substantially perpendicular to the bars 52, 54 and which extend externally and adjacent the guide slots 44, 46. When the first and second driven members 40, 42 are in the first position, a portion of the bars 52, 54 of the first and second driven members 40, 42 overlap or overlie one another so that the guide slots 44, 46 are commonly aligned.

To engage and drive the first and second article engaging means, a single drive driving means provides a support column 60 that is connected to and extends vertically upward from the base member 12. A power driven axle 62 is housed within the support column 60 wherein an end of the axle 62 extends outward from the support column 60. A swing arm 64 is connected to the axle 62 for rotational movement about the rotational axis 66 of the axle 62. The swing arm 64 may reciprocally rotate 180° counterclockwise or clockwise between the first position and the second position. For example, the swing arm 64 may rotate clockwise from the first position to the second position, and the swing arm 64 may then reciprocally rotate counterclockwise 180° back to the first position. Likewise, the swing arm 64 may rotate counterclockwise 180° from the first position to the second position, and the swing arm 64 may reciprocally rotate 180° clockwise back to the first position from the second position. Any possible combination or sequences of the 180° reciprocal rotations between the first position and the second position may be utilized to transfer the articles 16 to the desired locations.

The single drive driving means engages the driven members 40, 42 by providing a first roller 68 and a second roller 70 coaxially aligned and rotatably supported on the swing arm 64. As noted earlier, the first and second driven members 40, 42 partially overlap so that the first roller 68 rollingly engages the guide slot 44 of the first driven member 40 and the second roller 70 rollingly engages the guide slot 46 of the second driven member 42. Thus, when the swing arm 64 is in the first position, both the first and second rollers 68, 70 rollingly engage the guide slots 44, 46 of the first and second driven members 40, 42, respectively, since a partial portion of the first and second driven members 40, 42 are overlapped in the first position. Therefore, when the swing arm 64 rotates counterclockwise or clockwise toward one of the first and second article engaging means, respectively, one of the first and second rollers 68, 70 will quickly roll out of engagement with the guide slot 44, 46 of its corresponding driven member 40, 42.

Figure 4:
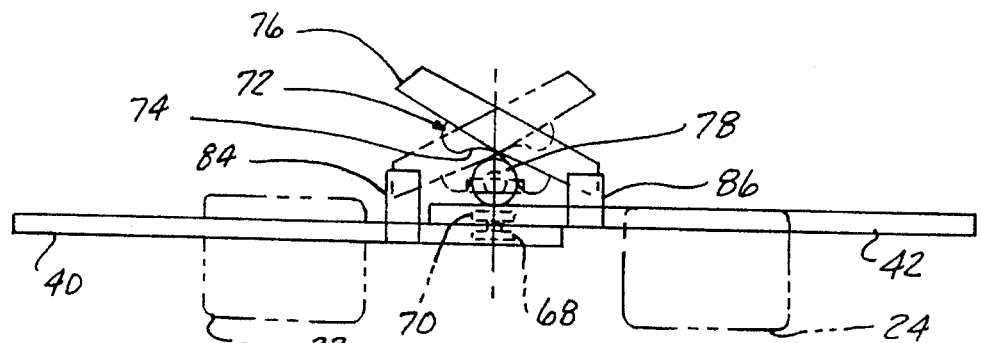
FIG. 4 is a top view of a supporting means engaging the second article engaging means in the first position and showing in phantom the supporting means engaging the first article engaging means in the first position.

In order to support the article engaging means in the first position when its corresponding roller 68, 70 disengages the guide slot 44, 46 of the driven member 40, 42, the supporting means provides a cam 72 that is pivotally connected to the top of the support column 60, as best seen in FIGS. 3–4. The cam 72 has a kidney shaped cam surface 74 with a substantially flat top and bottom surface. A substantially rectangular latch member 76 is fixedly connected to the top surface of the cam 72. A cam follower or roller 78 is rotatably supported on the free end of the swing arm 64 and rotates about a rotational axis 80 offset and substantially parallel to a longitudinal axis 82 of the swing arm 64. The cam follower 78 rollingly engages the cam surface 74 of the cam 72 when the swing arm 64 initially rotates in and out of the first position in either the clockwise or counterclockwise direction. When the swing arm 64 rotates toward one of the first and second article engaging means in the counterclockwise or clockwise direction away from the first position, the cam follower 78 rollingly engages the cam surface 74 of the cam 72 and pivots the cam 72 toward the other first and second article engaging means that is not being driven by the driving means.

Each of the first and second driven members 40, 42 have an inverted L-shaped flange 84, 86, respectively, that extends upward from the top bar 52, 54, respectively, of the driven members 40, 42 and rearward toward the latch member 76, as seen in FIGS. 1–4. When the latch member 76 is pivoted toward one of the flanges 84, 86, the flanges 84, 86 are initially vertically higher than the latch member 76 when both the first and second work piece engaging means are in the first position. This occurs by incorporating a downwardly extending arc 88 into the overlapping portions of the guide slots 44, 46. This small downwardly arcuate portion 88 of the guide slots 44, 46 lifts the entire first and second article engaging means slightly higher when in the first position so that the flanges 84, 86 are not interfering or engaging the latch member 76 when both the first and second article engaging means are in the first position. When the swing arm 64 rotates far enough to allow one of the first and second rollers 68, 70 to disengage from its corresponding guide slot 44, 46, the flanges 84, 86 will be free to engage the latch member 76. Thus, the latch member 76 supports one of the article engaging means when only that one article engaging means remains in the first position.

To operate the article transfer apparatus 10, both the first and second article engaging means may begin in the first position, as seen in FIGS. 1–3, the article transfer apparatus 10 may begin at a first work station, and the article holding means may be in a released or open position without engaging an article 16. To lower the first article engaging means from the first position to the second position, the swing arm 64 begins to rotate toward the first article engaging means in the counterclockwise direction. As the swing arm 64 begins to rotate, the cam follower 78 engages the cam surface 74 of the cam 72 and pivots the latch member 76 toward the flange 86 of the second driven member 42. The swing arm 64 continues to rotate counterclockwise wherein the second roller 70 rolls out of and disengages from the guide slot 46 of the second driven member 42. When the second roller 70 disengages from the guide slot 46 of the second driven member 42, the flange 86 engages the latch member 76 of the supporting means, and the second article engaging means is thus supported in the first position, as seen in FIG. 4.

As the swing arm 64 further rotates, the first roller 68 may travel the length of the guide slot 44 of the first driven member 40. When the swing arm 64 has rotated 90°, the first work piece engaging means has moved vertically downward midway between the first position and the second position, and the first roller 68 has traveled its furthest distance along the guide slot 44 of the first driven member 40 as seen in phantom line in FIG. 2. As the swing arm 64 continues to rotate downward in a counterclockwise direction, the first roller 68 travels back into the arcuate portion 88 of the guide slot 44 wherein the first article engaging means arrives at the second position. The grippers 36 of the first article holding means may then actuate securing the article 16 for movement back to the first position. The swing arm 64 then begins its reciprocal movement in a clockwise direction back toward the first position.

The base member 12 may then move the article transfer apparatus 10 along the guide rail 14 or second path of travel to a second work station. The swing arm 64 may then rotate toward the second article engaging means in the clockwise direction wherein the cam follower 78 engages the cam surface 74 of the cam 72 and pivots the latch member 76 toward the flange 84 of the first driven member 40. The first roller 68 disengages from the guide slot 44 of the first driven member 40, and the flange 84 of the first driven member 40 engages the latch member 76 to support the first article engaging means in the first position, as seen in phantom line in FIG. 4. The swing arm 64 rotates 180° in the clockwise direction wherein the second article engaging means assumes the second position, as seen in phantom line in FIG. 2. The grippers 38 on the second article engaging means may then clasp a finished article 16, and thus, the swing arm 64 may return to the first position thus raising the finished article 16 from the second work station.

Again, the base member 12 may continue to move along the guide rail 14 or second path of travel to an additional work station wherein the unfinished article 16, which was being held by the first article engaging means, can be lowered into the work station to be processed. The base member 12 may again move along the guide rail 14 or second path of travel to yet another work station wherein the finished article 16, which may be held by the second engaging means, may be lowered and unloaded. The base member 12 may then return the article transfer apparatus 10 back to the first work station wherein the cycle may be continuously repeated.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An article transfer apparatus for moving at least one article from a first position to a second position comprising:

first and second means for engaging said article wherein said first and second engaging means are reciprocally moveable between said first position and said second position independent of one another; and single means for independently and selectively driving each of said first and second article engaging means between said first position and said second position.

2. The article transfer apparatus stated in claim 1, further comprising:

a first path of travel defined by movement of said first and second article engaging means between said first position and said second position; and means for moving said article transfer apparatus along a second path of travel wherein said second path of travel is substantially perpendicular to said first path of travel.

3. The article transfer apparatus stated in claim 2, wherein said article transfer apparatus moving means comprises:
- a guide rail defining said second path of travel; and
- a base member movable on said guide rail for travel along said second path of travel.

4. The article transfer apparatus stated in claim 1, further comprising:
- means for supporting one of said first and second article engaging means in said first position when said single drive driving means drives the other of said first and second article engaging means outside said first position.

5. The article transfer apparatus stated in claim 1, wherein said first and second article engaging means each comprises:
- a lift arm having opposite ends;
- means for releasably holding said article coupled to one of said opposite ends of said lift arm; and
- means, connected to said other end of said lift arm, for cooperatively engaging said single drive driving means.

6. An article transfer apparatus for moving at least one article from a first position to a second position comprising:
- a base member moveable on a guide rail for movement along a predetermined path;
- first and second means for engaging said article movably connected to said base member for movement between said first position and said second position;
- single drive means for independently and selectively driving each of said first and second article engaging means between said first position and said second position, and said single drive driving means connected to said base member; and
- means for supporting one of said first and second article engaging means in said first position when the other of said first and second article engaging means is driven by said single drive driving means outside of said first position.

7. The article transfer handling apparatus stated in claim 6, further comprising:
- a first path of travel defined by said first and second article engaging means moving between said first and second positions;
- a second path of travel defined by said base member moving along said guide rail; and
- said first path of travel being substantially perpendicular to said second path travel.

8. The article transfer apparatus stated in claim 6, wherein said first and second article engaging means each comprises:
- an elongated lift arm having opposite ends and a longitudinal axis extending the length of said lift arm;
- a releasable article holder coupled to one of said opposite ends of said lift arm; and
- means, connected to said other opposite end of said lift arm, for receiving said single drive driving means.

9. The article transfer apparatus as stated in claim 8, wherein each of said receiving means comprises:
- an elongated driven member having a longitudinal axis substantially perpendicular to said longitudinal axis of said lift arm, and said elongated driven member having a guide slot for receiving and guiding said single driving means.

10. The article transfer apparatus stated in claim 6, wherein said single drive driving means comprises:
- a support member connected to and extending from said base member;
- a swing arm rotatably connected to said support member for rotational movement about a rotational axis; and
- first and second rollers rotatably supported by said swing arm for cooperatively engaging said first and second article engaging means.

11. The article transfer apparatus stated in claim 10, wherein said supporting means comprises:
- a cam pivotally connected to said support member;
- means, connected to said cam, for latching said one of said first and second article engaging means in said first position; and
- a cam follower rotatably supported on said swing arm and cooperatively engaging said cam for pivoting said latching means into engagement with one of said first and second article engaging means in said first position when said driving means drives the other of said first and second article engaging means outside said first position.

12. An article transfer apparatus for moving at least one article from a first position to a second position comprising:
- a guide rail;
- a base member movable on said guide rail for movement along said guide rail between a plurality of work stations;
- a first and second lift arm movably connected to said base member for movement between said first position, wherein said first and second lift arm is in a vertically raised position, and said second position, wherein said first and second lift arm is in a vertically lowered position, and said first and second lift arms having opposite ends;
- first and second means for releasably holding said article wherein said first and second article holding means is connected to one of said opposite ends of said first and second lift arms;
- a first and second elongated driven member connected to the other end of said opposite ends of said first and second lift arms, and said first and second elongated driven member having a guide slot wherein a portion of said first and second elongated driven members overlap to commonly align said guide slots in said first position, and each of said first and second elongated driven members having a flange extending outward from said first and second elongated driven members;
- a vertical support member connected to and extending upward from said base member, and said support member having a longitudinal axis;
- a rotational swing arm rotatably supported on said vertical support member for rotation about a rotational axis substantially normal to said longitudinal axis of said vertical support member wherein said swing arm rotates to drive one of said first and second lift arms between said first position and said second position;
- first and second rollers rotatably supported and coaxially aligned on said swing arm about an axis substantially parallel to said rotational axis of said swing arm, and said first and second rollers each engaging said guide slots of said first and second elongated driven members, respectively;
- a cam pivotally connected to said vertical support member;

a latch member connected to said cam for engaging said flange of one of said first and second elongated driven members when said one of said first and second rollers, respectively, is not engaging said guide slot of one of said first and second elongated driven members; and a cam follower rotatably supported on said swing arm for engaging said cam and pivoting said latch member to engage said flange of one of said first and second elongated driven members in said first position when said one of said first and second rollers is not engaging said guide slot of one of said first and second elongated driven members.

* * * * *